Patented Sept. 21, 1954

2,689,862

UNITED STATES PATENT OFFICE 2,689,862

IMPROVEMENT IN COLOR OF ARYL ALKANE SULFONATES

William S. Knowles, Kirkwood, Mo., assignor to Monsanto Chemical Company, St. Louis, Mo., a corporation of Delaware No Drawing. Application April 20, 1951, Serial No. 222,148

5 Claims. (Cl. 260—456)

This invention relates to aryl alkane sulfonates; more specifically, this invention relates to a process for the improvement of the color of aryl alkane sulfonates having the formula

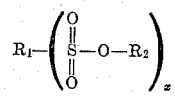

wherein $R_1$ represents a radical derived from a saturated aliphatic hydrocarbon, $R_2$ represents a phenyl radical and $x$ represents an integer.

The aryl alkane sulfonates are useful as plasticizers, especially for polyvinyl chloride. The aryl alkane sulfonates prepared according to the processes currently used are usually quite dark in color. Even after purification by distillation, the aryl alkane sulfonates are still frequently so dark in color that their utility is seriously restricted. It is an object of this invention to provide an improved method for the improvement in color of aryl alkane sulfonates. Further objects will become apparent from the description of the invention which follows.

It has now been found that the color of aryl alkane sulfonates may be significantly reduced by treating the aryl alkane sulfonate with sulfuric acid. According to the novel process of this invention, therefore, the color of aryl alkane sulfonates is reduced by subjecting the aryl alkane sulfonate to the action of sulfuric acid. After this sulfuric acid treatment, the aryl alkane sulfonate having significantly reduced color is recovered from the reaction mixture and the last traces of sulfuric acid removed from the aryl alkane sulfonate. The following examples are illustrative of the novel improved process of this invention:

Example I

A reactor equipped with a stirrer and a bottom outlet was charged with 390 g. of a distilled phenyl alkane sulfonate and 40 g. of 75% sulfuric acid. The alkane group in the above referred to phenyl alkane sulfonate was derived from an 8 carbon atom saturated hydrocarbon having a distillation range of 122° C.–145° C. The initial color of the phenyl alkane sulfonate charged to the reactor was 300 APHA. The mixture was stirred for ½ hour at 25° C. and then allowed to settle, whereupon it separated into two layers. The lower acid layer was drawn off and the oil layer treated at 60–70° C. with 6 g. of Attapulgus earth for ½ hour and then filtered. The phenyl alkane sulfonate recovered as the filtrate had a color of 100 APHA, indicating a significant improvement in color.

Example II

The procedure set forth in Example I was repeated utilizing in place of the phenyl alkane sulfonate described therein, a crude phenyl alkane sulfonate wherein the alkane group was derived from a 16 carbon atom petroleum hydrocarbon. Initially the phenyl alkane sulfonate was quite dark in color and had to be diluted in order that a color determination could be made. 2 g. of the phenyl alkane sulfonate diluted to 100 cc. with acetone had a color of 5 NPA. After the sulfuric acid treatment as described in Example I, the color of such a dilution was 3.5 NPA, indicating a significant improvement in color.

Example III

The procedure set forth in Example I was repeated utilizing in place of the phenyl alkane sulfonate described therein, a phenyl alkane sulfonate wherein the alkane group was derived from a 12 to 14 carbon atom normal paraffin having a distillation range of 426°–467° F. The initial color of the phenyl alkane sulfonate was 2.75 NPA, while the color after treatment was 1.75 NPA, indicating quite an improvement in the color as a result of the sulfuric acid treatment.

Example IV

The procedure set forth in Example I was repeated utilizing in place of the phenyl alkane sulfonate described therein, a distilled phenyl alkane sulfonate wherein the alkane group was derived from a 16 carbon atom branched chain petroleum hydrocarbon. The initial color of the phenyl alkane sulfonate was 3 NPA while the final color after treatment with sulfuric acid was 2.5 NPA, indicating a significant improvement in color.

Specific modifications of this novel invention have been illustrated in the preceding examples. Obviously, however, the specific reactants, reaction conditions and quantities of reactants specified therein may be varied considerably without departing from the scope of this invention. For example, while the preceding examples have illustrated those aryl alkane sulfonates wherein the aryl group is the phenyl group, i. e., an aryl alkane sulfonate made from phenol, mono or poly substituted phenols may be utilized. Thus, the aryl radical in the aryl alkane sulfonate made from a petroleum hydrocarbon may contain one or more inert substituents of which the following are illustrative: halogens, such as chlorine, bromine, iodine and fluorine; alkyl groups, such as methyl, ethyl, propyl, isopropyl, butyl, tert-butyl, etc.; aryl groups, such as tert-butyl phenyl, etc.; alkoxy groups, such as methoxy, ethoxy, propoxy, isopropoxy, etc.

Similarly, the alkane group in the aryl alkane sulfonates of this invention may be derived from any saturated aliphatic hydrocarbon. The aryl alkane sulfonates made from saturated aliphatic hydrocarbons containing from 6 to 24 carbon atoms have been found to respond most advantageously to this novel color improvement process. The alkanes utilized in preparing the aryl alkane sulfonates which may be subjected to the purification process of this invention may contain minor amounts of aromatics of various types without having any significant deleterious effect upon the novel process of this invention.

The aryl alkane sulfonates utilized in this invention may be prepared by any convenient method well known to those skilled in the art. A particularly simple and useful method comprises reacting a saturated petroleum hydrocarbon with chlorine and sulfur dioxide in the presence of an activator, such as light, peroxides, etc., to form alkane sulfone chlorides, which are then reacted with a phenol in the presence of an alkali, such as an alkali metal hydroxide, ammonia, the alkaline earth metal hydroxides, or the alkali metal or alkaline earth metal carbonates. This latter reaction may be carried out either in the presence or absence of a suitable inert reaction medium. The crude alkane sulfonates thus formed may then be separated from unreacted alkanes by any method well known to those skilled in the art, such as by fractionation under reduced pressure or by steaming.

The aryl alkane sulfonates with which this invention are concerned may be the aryl esters of alkane monosulfonates, the aryl esters of alkane polysulfonates or mixtures thereof. Such aryl alkane sulfonates may be represented by the previously described formula

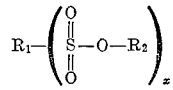

wherein $R_1$ represents a radical derived from a saturated aliphatic hydrocarbon, $R_2$ represents a phenyl radical and $x$ represents an integer. Constituting a particularly useful and preferred embodiment of this invention are those aryl alkane sulfonates having the above formula wherein $x$ represents an integer from 1 to 3 inclusive.

The quantity and concentration of sulfuric acid utilized in the novel process of this invention may be varied over a substantial range. It is preferred that concentrated sulfuric acid be utilized and sulfuric acid having a sulfuric acid content of from about 65% to about 85% has been found to be particularly advantageous. The temperature at which the sulfuric acid treatment is carried out may also be varied over a substantial range. It is preferred, however, that this novel process be carried out at a temperature in the range of from about 0° C. to about 50° C. Higher or lower temperatures than this preferred range may be utilized but offer no significant advantage.

The time required for the sulfuric acid treatment of an aryl alkane sulfonate in accordance with the novel process of this invention is also subject to substantial variation, being dependent upon many variables such as the initial color of the aryl alkane sulfonate, the final color desired, the concentration and quantity of sulfuric acid utilized, the temperature at which the treatment is carried out, the degree and type of agitation utilized during the treating process, etc. Obviously, the reaction time will be that time which is required to obtain the desired color improvement.

After the treating process is completed, the aryl alkane sulfonate may be recovered from the treated mixture by any method well known to those skilled in the art. Since the treating mixture, on standing, will separate into a sulfuric acid layer and an organic layer, separation of the sulfuric acid from the aryl alkane sulfonate is conveniently accomplished. Last traces of sulfuric acid can be removed from the aryl alkane sulfonate by any method well known to those skilled in the art, such as by treatment with any alkaline earth or clay, such as Attapulgus earth.

What is claimed is:

1. In a process for the improvement in color of aryl alkane sulfonates having the formula

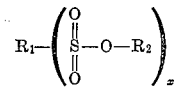

wherein $R_1$ represents a radical derived from a saturated aliphatic hydrocarbon, $R_2$ represents a phenyl radical and $x$ represents an integer, the step comprising subjecting the said aryl alkane sulfonate to the action of concentrated sulfuric acid having a sulfuric acid content in the range from about 65% to about 85%.

2. In a process for the improvement in color of aryl alkane sulfonates having the formula

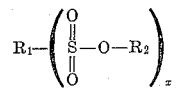

wherein $R_1$ represents a radical derived from a saturated aliphatic hydrocarbon, $R_2$ represents a phenyl radical and $x$ represents an integer, the step comprising mixing the said aryl alkane sulfonate with concentrated sulfuric acid having a sulfuric acid content in the range of from about 65% to about 85% at a temperature in the range of from about 0° C. to about 50° C.

3. In a process for the improvement in color of aryl alkane sulfonates having the formula

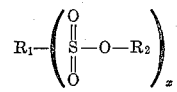

wherein $R_1$ represents a radical derived from a saturated aliphatic hydrocarbon containing from 6 to 24 carbon atoms, $R_2$ represents a phenyl radical and $x$ represents an integer from 1 to 3, the step comprising mixing the said aryl alkane sulfonate with concentrated sulfuric acid having a sulfuric acid content in the range of from about 65% to about 85%.

4. In a process for the improvement in color of aryl alkane sulfonates having the formula

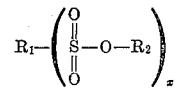

wherein $R_1$ represents a radical derived from a saturated aliphatic hydrocarbon containing from 6 to 24 carbon atoms, $R_2$ represents a phenyl radical and $x$ represents an integer from 1 to 3, the step comprising mixing the said aryl alkane sulfonate with concentrated sulfuric acid having a sulfuric acid content in the range of from about 65% to about 85% at a temperature in the range of from about 0° C. to about 50° C.

5. In a process for the improvement in color of aryl alkane sufonates having the formula

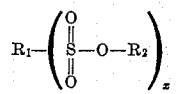

wherein $R_1$ represents a radical derived from a saturated aliphatic hydrocarbon containing from 6 to 24 carbon atoms, $R_2$ represents the phenyl radical and $x$ represents an integer from 1 to 3, the step comprising subjecting the said aryl alkane sulfonate to the action of sulfuric acid having a sulfuric acid content in the range of from about 65% to about 85% at a temperature in the range of from about 0° C. to about 50° C. and then recovering the color-improved aryl alkane sulfonate.

References Cited in the file of this patent

UNITED STATES PATENTS

| Number | Name | Date |
|---|---|---|
| 1,931,058 | Clemmensen | Oct. 17, 1933 |
| 2,121,845 | Wernicke | June 28, 1938 |

FOREIGN PATENTS

| Number | Country | Date |
|---|---|---|
| 322,057 | Great Britain | Nov. 28, 1929 |
| 459,310 | Great Britain | Jan. 6, 1937 |
| 627,377 | Great Britain | July 14, 1949 |